US008566831B2

(12) United States Patent
Jellinek et al.

(10) Patent No.: US 8,566,831 B2
(45) Date of Patent: Oct. 22, 2013

(54) EXECUTION OF WORK UNITS IN A HETEROGENEOUS COMPUTING ENVIRONMENT

(75) Inventors: Ivan Jellinek, Hillsboro Beach, FL (US); Alberto Poggesi, Palo Alto, CA (US); Anthony C. Sumrall, San Jose, CA (US); Thomas A. Thackrey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/014,123

(22) Filed: Jan. 26, 2011

(65) Prior Publication Data
US 2012/0192191 A1 Jul. 26, 2012

(51) Int. Cl.
*G06F 9/46* (2006.01)

(52) U.S. Cl.
USPC ........................................................ 718/102

(58) Field of Classification Search
USPC .................................. 718/100, 102, 103, 104
See application file for complete search history.

(56) References Cited

U.S. PATENT DOCUMENTS

| 4,394,727 | A | | 7/1983 | Hoffman et al. |
| 5,126,932 | A | * | 6/1992 | Wolfson et al. ............... 709/202 |
| 5,301,324 | A | * | 4/1994 | Dewey et al. .................. 718/105 |
| 5,303,369 | A | * | 4/1994 | Borcherding et al. ........ 718/104 |
| 5,437,032 | A | * | 7/1995 | Wolf et al. ..................... 718/103 |
| 5,701,482 | A | * | 12/1997 | Harrison et al. .............. 718/105 |
| 5,748,468 | A | * | 5/1998 | Notenboom et al. ............. 700/3 |
| 5,793,982 | A | | 8/1998 | Shrader et al. |
| 5,881,238 | A | * | 3/1999 | Aman et al. ................... 709/226 |
| 6,085,217 | A | * | 7/2000 | Ault et al. ..................... 718/105 |
| 6,370,599 | B1 | | 4/2002 | Anand et al. |
| 6,496,823 | B2 | * | 12/2002 | Blank et al. ......................... 1/1 |
| 6,591,262 | B1 | | 7/2003 | MacLellan et al. |
| 6,742,006 | B2 | | 5/2004 | Raduchel et al. |
| 6,898,673 | B2 | * | 5/2005 | Gruner et al. ................. 711/130 |

(Continued)

FOREIGN PATENT DOCUMENTS

WO WO0161470 A2 8/2001

OTHER PUBLICATIONS

Huerta-Canepa, G. Dongman Lee, "An Adaptable Application Offloading Scheme Based on Application Behavior," 22nd International Conference on Advanced Information Networking and Applications, Mar. 25-28, 2008, pp. 387-392 (Abstract Only).

(Continued)

*Primary Examiner* — Van Nguyen
(74) *Attorney, Agent, or Firm* — Steven Chiu, Esq.; Blanche E. Schiller, Esq.; Heslin Rothenberg Farley & Mesiti P.C.

(57) ABSTRACT

Work units are transparently offloaded from a main processor to offload processing systems for execution. For a particular work unit, a suitable offload processing system is selected to execute the work unit. This includes determining the requirements of the work unit, including, for instance, the hardware and software requirements; matching those requirements against a set of offload processing systems with an arbitrary set of available resources; and determining if a suitable offload processing system is available. If a suitable offload processing system is available, the work unit is scheduled to execute on that offload processing system with no changes to the work unit itself. Otherwise, the work unit may execute on the main processor or wait to be executed on an offload processing system.

20 Claims, 4 Drawing Sheets

(56) References Cited

U.S. PATENT DOCUMENTS

| | | | |
|---|---|---|---|
| 6,901,488 B2 * | 5/2005 | Gruner et al. | 711/154 |
| 6,901,583 B1 | 5/2005 | Park | |
| 7,941,647 B2 | 5/2011 | Yates et al. | |
| 8,127,121 B2 | 2/2012 | Yates et al. | |
| 2004/0187126 A1 | 9/2004 | Yoshimura | |
| 2007/0226745 A1 * | 9/2007 | Haas et al. | 718/105 |
| 2007/0283349 A1 * | 12/2007 | Creamer et al. | 718/100 |
| 2008/0098208 A1 | 4/2008 | Reid et al. | |
| 2008/0189714 A1 | 8/2008 | Ault et al. | |
| 2008/0216073 A1 | 9/2008 | Yates et al. | |
| 2009/0012981 A1 | 1/2009 | Kogoh | |
| 2009/0089794 A1 * | 4/2009 | Hilton | 718/105 |
| 2009/0313633 A1 * | 12/2009 | Nardelli et al. | 718/104 |
| 2011/0289519 A1 | 11/2011 | Frost | |
| 2012/0144167 A1 | 6/2012 | Yates et al. | |
| 2012/0192191 A1 | 7/2012 | Jellinek et al. | |
| 2012/0222033 A1 * | 8/2012 | Byrum et al. | 718/102 |

OTHER PUBLICATIONS

Putnikovic, Branimir, Soran Skocir, "Database Migration Using Standard Data Unload and Load Procedures on z/OS Platform," 9th International Conference on Telecommunications, Jun. 13-15, 2007, pp. 259-266.

Office Action for U.S. Appl. No. 13/034,775 dated Nov. 8, 2012.

"z/Architecture—Principles of Operation," IBM Publication No. SA22-7832-08, 9th Edition, Aug. 2010, pp. 1-1496.

Notice of Allowance for U.S. Appl. No. 13/034,775 dated May 8, 2013, pp. 1-20.

* cited by examiner

EXECUTION OF WORK UNITS IN A HETEROGENEOUS COMPUTING ENVIRONMENT

BACKGROUND

This invention relates, in general, to heterogeneous computing environments, and in particular, to executing work units within such environments.

Work units, such as applications, jobs, computer programs or portions thereof, are assigned to processors for execution. In multiprocessor computing environments that include a plurality of symmetric processors, the assignment of work units to processors is less complex than in those multiprocessor computing environments that include asymmetric processors. If the processors are symmetrical, and thus, have the same features, then a work unit can execute on any of the processors, assuming there are available resources. However, if the processors are asymmetrical, and thus, do not have the same features, then a particular work unit may be unable to execute on a particular processor. That is, if a work unit needs a feature that is only present on some of the processors, then the work unit will have to execute on a processor having that feature.

The assignment of work units to processors in multiprocessor computing environments having asymmetric processors can be difficult, tedious, and error prone. This is because of the expansive amount of information that needs to be tracked and considered in properly assigning work units to processors for execution.

BRIEF SUMMARY

The shortcomings of the prior art are overcome and additional advantages are provided through the provision of a computer program product for facilitating execution of work units in a computing environment. The computer program product comprises a storage medium readable by a processing circuit and storing instructions for execution by the processing circuit for performing a method. The method includes, for instance, analyzing, by an analyzer executing on a processor, one or more resource requirements of a work unit to be executed; determining, based on the analyzing, whether the work unit is to be executed on the processor or an offload processing system different from the processor, the offload processing system and processor being heterogeneous of one another; obtaining, responsive to the determining indicating the work unit is to be executed on the offload processing system, an indication of one or more offload processing systems satisfying one or more criteria for execution of the work unit; checking whether at least one offload processing system of the indication of one or more offload processing systems has sufficient resources to execute the work unit; selecting, responsive to the checking specifying at least one offload processing system that has sufficient resources, a selected offload processing system to execute the work unit; and assigning the work unit to be executed on the selected offload processing system for execution, wherein the selected offload processing system has at least one of a different operating system, a different architecture or a different external attachment from the processor.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for transparently offloading individual work units from a main processor to a suitable offload processing system for execution. In one example, this re-assignment of a work unit includes determining the requirements of the work unit, including, for instance, the hardware and software requirements; matching those requirements against a set of offload processing systems with an arbitrary set of available resources; and determining if a suitable offload processing system is available. If a suitable offload processing system is available, the work unit is assigned to execute on that offload processing system with no changes to the work unit itself. Otherwise, the work unit may execute on the main processor or wait to be executed on an offload processing system.

Figure 1A:
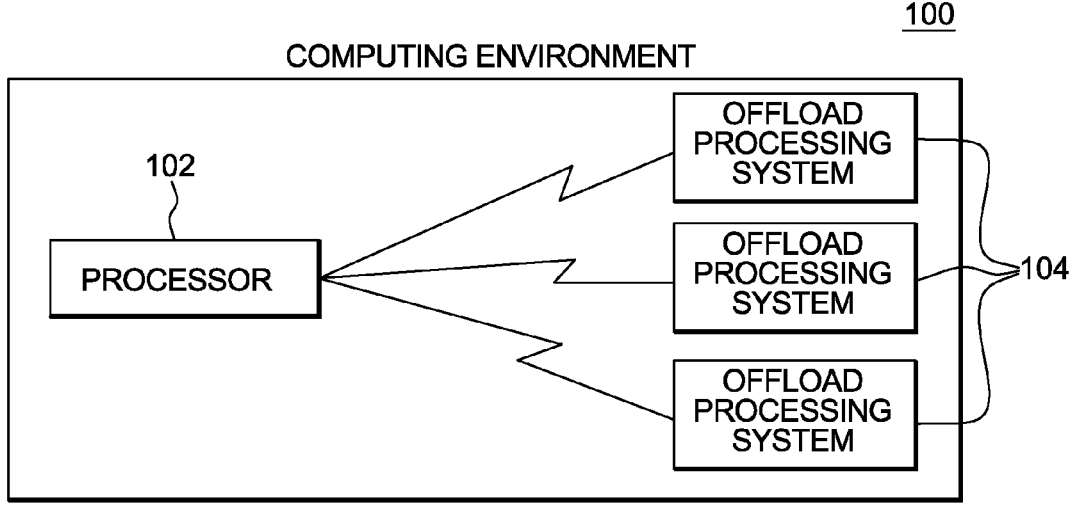
FIG. 1A depicts one example of a computing environment to incorporate and use one or more aspects of the present invention.

One embodiment of a computing environment to incorporate and use one or more aspects of the present invention is described with reference to FIG. 1A. In this particular example, a computing environment 100 includes one or more main processors 102 coupled to one or more offload processing systems 104. Main processor 102 is, in one example, based on the z/Architecture® offered by International Business Machines Corporation. For instance, such a processor may be the IBM® z/Enterprise™ 196 (z196) server offered by International Business Machines Corporation or other servers based on the z/Architecture® (or other architecture). z/Architecture® and IBM® are registered trademarks of International Business Machines Corporation, Armonk, N.Y. Other names used herein may be registered trademarks, trademarks or product names of International Business Machines Corporation or other companies.

An offload processing system may include one processor and its external attachments, if any (e.g., storage (e.g., DASD, tape, etc.) or other attachments), or a system having a plurality of processors and its attachments, if any (e.g., a mainframe computer with tightly coupled processors or other types of systems). In this example, one or more of the offload processing systems are heterogeneous from processor 102. An offload processing system 104 that is heterogeneous from processor 102 has, for instance, a different operating system, a different architecture, and/or one or more different external attachments than processor 102. As examples, the operating system may be AIX® or Linux (instead of, for instance, z/OS® executed on main processor 102), and/or the architecture may be PowerPC® or Intel®. As a further example, the offload processing system may have a certain tape drive or other external feature not included with the main processor. Many other examples exist. The offload processing system is heterogeneous from the main processor if, for instance, it has at least one feature different from the main processor. The offload processing systems may be different from one another or similar. In one example, there are many offload processing systems, some of which are homogonous to one another and others of which are different. AIX®, z/OS® and PowerPC® are registered trademarks of International Business Machines Corporation, Armonk, N.Y.; and Intel® is a registered trademark of Intel Corporation.

In this particular example, the offload processing systems are loosely coupled to the main processor. That is, the offload processing systems may share a communications network (e.g., network connection, memory, or direct access storage as a communications medium), but, otherwise, there is an absence of sharing of resources (e.g., it is not necessary for them to share additional memory or other peripheral devices with the main processor). The trade-off between sharing additional resources or not is the increase in cost and complexity required to permit sharing versus the reduced performance or offload capability if required resources are not available. For example, sharing Network Attached Storage (NAS) is relatively cheap and multiple offload processing systems and main processors could share access. Similarly, network connections are relatively easy and not costly. However, access to legacy tape drives or DASD is more costly or, given certain architectures, cost prohibitive.

Figure 1B:
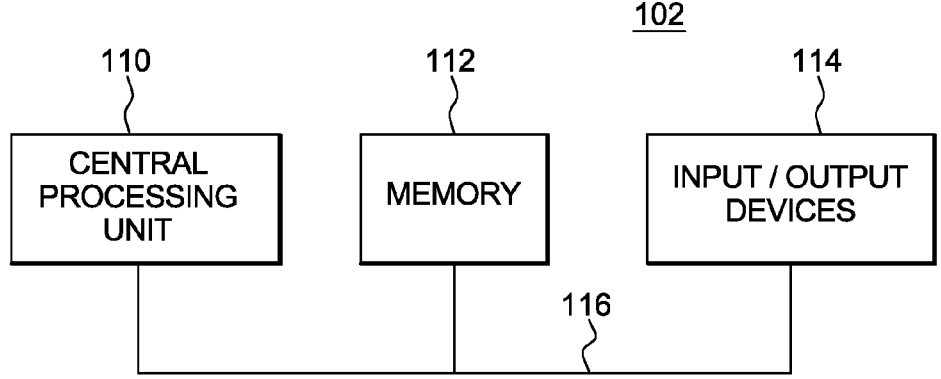
FIG. 1B depicts one embodiment of further details of a processor of FIG. 1A, in accordance with an aspect of the present invention.
Figure 1C:
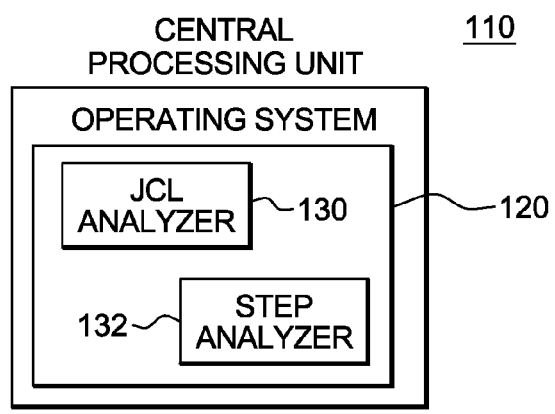
FIG. 1C depicts one example of further details of a central processing unit of the processor of FIG. 1B, in accordance with an aspect of the present invention.

Further details regarding main processor 102 are described with reference to FIG. 1B. In one example, processor 102 includes at least one central processing unit 110, memory 112 and one or more input/output devices and/or interfaces 114 coupled to one another via one or more buses 116. Executing within central processing unit 110 is, for instance, an operating system 120, as depicted in FIG. 1C. In one example, the operating system is the z/OS® operating system offered by International Business Machines Corporation; however, in other examples, other operating systems are used. As one example, the operating system executes a plurality of programs, such as a job control language (JCL) analyzer 130 and a step analyzer 132.

In one example, JCL analyzer 130 and step analyzer 132 are part of a job entry subsystem (JES) of z/OS®. JES is the component of the operating system that handles receiving work units into the operating system, scheduling them for processing, and controlling their output processing. In other embodiments, the JCL analyzer and/or step analyzer are not part of JES. Use of the JCL analyzer and the step analyzer are described in further detail below.

In accordance with an aspect of the present invention, a determination is made as to whether a particular work unit is to be executed on the main processor or offloaded to an offload processing system to be executed thereon. In one particular example, the work unit is part of an application that includes one or more work units. The application begins executing on processor 102, and for each work unit (or a subset thereof), a determination is made as to whether the work unit is to be executed on the main processor (i.e., the processor on which the application or work unit was initiated) or an offload processing system. This decision process is further described with reference to FIG. 2.

Figure 2:
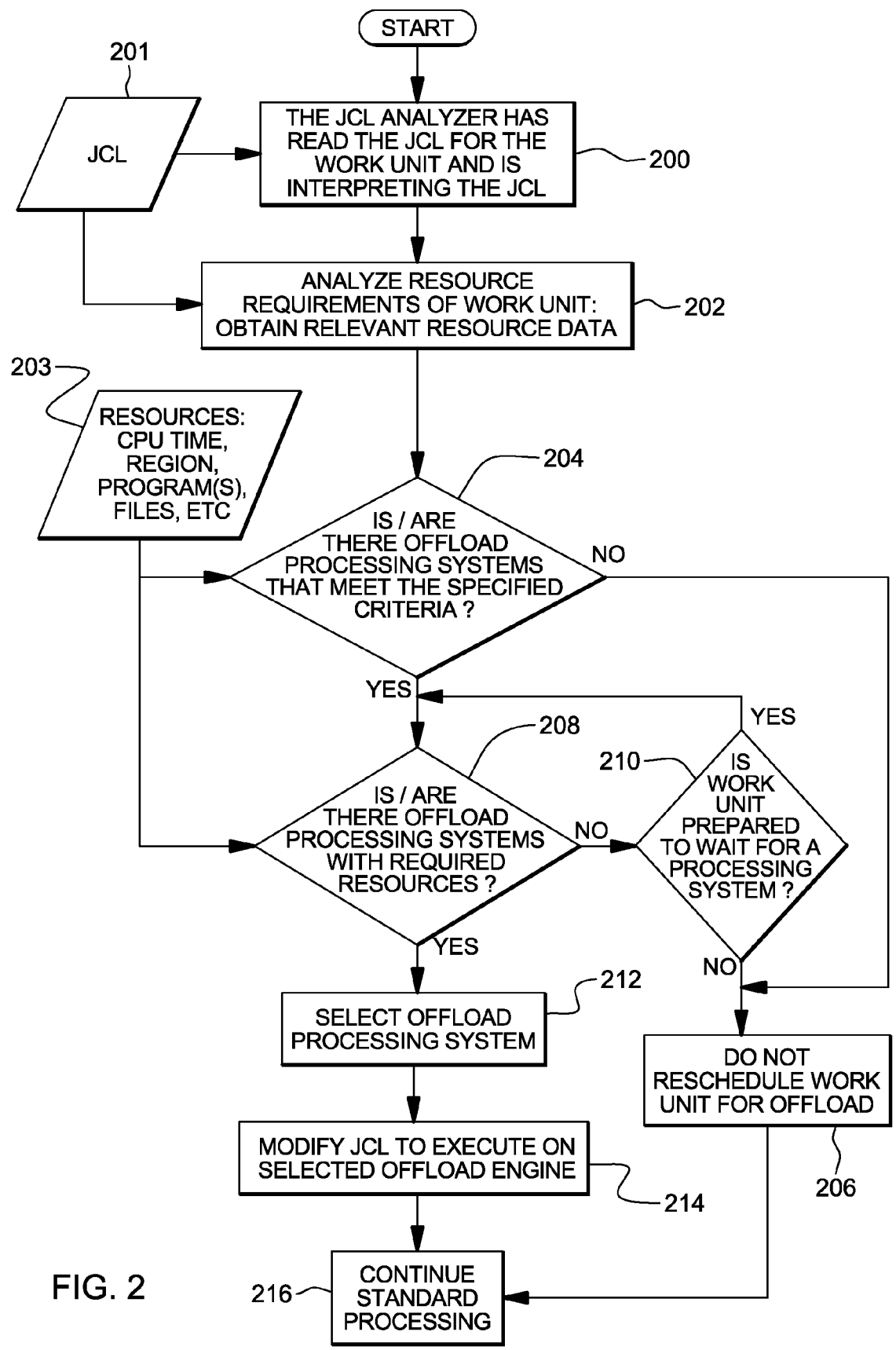
FIG. 2 depicts one embodiment of the logic to determine whether a particular work unit is to execute on the processor or an offload processing system, in accordance with an aspect of the present invention.

Referring to FIG. 2, in one example, this logic is performed by an analyzer, such as, for instance, JCL analyzer 130 (FIG. 1C). (In other embodiments, the analyzer may be other than the JCL analyzer.) Input to the analyzer is the Job Control Language (JCL) 201 for the work unit being processed. The analyzer reads the JCL for the work unit and begins interpreting the same, STEP 200. For instance, it analyzes the resource requirements of the work unit and obtains the relevant resource data, STEP 202. That is, it determines based on the JCL what resources (e.g., amount of CPU time, amount of memory, files, kinds of programs it executes, required hardware, external attachments, etc.) the work unit needs to execute, and obtains any necessary programs, files, data, etc.

Thereafter, a determination is made as to whether there are one or more offload processing systems that meet specified criteria for execution of the work unit. That is, are there one or more offload processing systems that have the hardware and software requirements needed for the work unit and meet other specified criteria for the work unit, INQUIRY 204. Input to this decision is resource information 203, including, for instance, CPU times, region sizes, programs, files, etc. A work unit may be ineligible to offload if, for instance:

A needed licensed product is not available in an offload processing system;

The region request is greater than that supported by an offload processing system;

CPU time requested is larger than supported by an offload processing system;

Resources required are unavailable in an offload server (e.g., tapes; DASD; optical devices; etc.; other hardware/system resources found in the JCL scan);

Program defined as not eligible by the customer through configuration;

Program previously determined as incompatible with an offload processing system—in the 'ineligible program list' database; and/or Customer coded control statement indicates the entire application or work unit is ineligible for offload processing.

If the criteria cannot be met, then in this example, the work unit is not scheduled for offload processing, STEP 206, and standard processing is continued, STEP 216. For example, the work unit is scheduled to execute on the main processor. In a further example, if the criteria cannot be met, a determination is made as to whether the work unit is prepared to wait for an offload processing system that can meet the criteria or for the criteria to change (e.g., program or work unit now defined to be eligible for offloading). If so, INQUIRY 204 is repeated after a defined delay. Otherwise, standard processing is performed, in which the work unit is scheduled to execute on the main processor.

Returning to INQUIRY 204, if there are one or more offload processing systems that meet the specified criteria, then a determination is made as to whether one or more of those offload processing systems have the required resources currently available for executing the work unit, INQUIRY 208. If not, then, in one example, a determination is made as to whether the work unit is prepared to wait for an offload processing system, STEP 210. If the work unit is not prepared to wait, then the work unit is not scheduled for offload, STEP 206, and processing continues with STEP 216, in which in this example, the work unit is scheduled to execute on the main processor. Otherwise, INQUIRY 208 is repeated after a defined delay. In one example, it may be repeated a number of times depending on policy.

Returning to INQUIRY 208, if there are one or more offload processing systems that meet the criteria and currently have available resources (including hardware, software and/or external attachment resources), then one of the offload processing systems is selected for executing the work unit, STEP 212. If there are more than one offload processing systems available that have the required resources, then a technique is used to select one of the processing systems. For example, a round robin approach may be used or a priority may be assigned to each offload processing system and the selection is based on priority. Many other techniques are also available. In one particular example, a best fit technique is used in which the offload processing system that best fits the work unit based on a defined formula is selected. One specific example of this is provided below.

This specific example is intended to define what resources and services are required to validate that a particular work unit can be offloaded and to which specific offload processing system (OFL). The work unit requirements together with the available resources in one or more OFLs, when merged, determine whether a work unit can run and where. One specific assumption in this example is that only one OFL is used in servicing a work unit. (In other examples, this assumption is not made.)

A work unit employs certain services and offload processing systems provide a (possibly asymmetric) set of services. Matching these in the most cost effective way is a goal, in this example. There are other potential services or requirements that are imposed by customers—for example, a job is to run within a specific time window—that are not included in this example, but may be included in others. The data included here is from job control information (e.g., JCL)—i.e., I/O profile, the invoked program's characteristics and known features of the system it runs on.

Table 1 below shows examples of scheduling resources, whether they are singular or multiple, offload processing systems (OFLs) matching the resources and relevant comments and constraints.

TABLE 1

Work Units require, OFLs provide the following resources:

| Resource | Quantity | Host Notes | OFL Supported Quantity | OFL Notes |
|---|---|---|---|---|
| CPU Resource | Single value | Maximum amount permitted | Has a speed constant | Often much different speed from the host |
| Memory | Single Value | Maximum amount | Single value for max | Maximum amount may be much less than host |
| Types of DASD, i.e., 3390 . . . | Multiple | Any number of multiple types | Some - 3380, 3390, SCSI, NAS | Asymmetric configuration from host, some may be supported, others not |
| Types of tape | A few | Any number of multiple types | 3420, 3480, 3490, VTS | Asymmetric or non-existent, same as above |
| Other, multi-use (i.e., shared among systems) hardware | A very few or none | Unusual request, usually one of a kind | Network components, SCSI devices, network print... | Very highly unusual request |
| Single use hardware | A very few or none | Unusual request, usually one of a kind | CD, DVD, cypto | Unusual request, usually one of a kind |
| Well defined, existing files | | Any number; initially unknown (but knowable from input) | Based on hardware configuration | Some subset of the host system's available |
| Well defined new files (on specific volumes) | | Any number unknown and unknowable size | Based on hardware configuration | Some subset of the host system's available |
| Temporary files | List | Any number unknown and unknowable size | Known max volumes/space available | Local or shared with host |
| Sysin/sysout files | List | Any number unknown and unknowable size | | Provided through agents on both systems |
| System (supervisor) services | List | Unknown but knowable if analyzed (e.g., manually) | Subset, possibly down level | A subset of the host's - is to be well defined |
| Access methods | Sam, Pam, PDSE, VSAM, | Mostly unknown until | Sam, pam, pdse, vsam, | Can be provided either |

TABLE 1-continued

Work Units require, OFLs provide the following resources:

| Resource | Quantity | Host Notes | OFL Supported Quantity | OFL Notes |
|---|---|---|---|---|
| | SNA, TCP, EXCP | OPENed | excp | locally or through agents |
| Well defined programs (some being licensed, others not) | Large potential list | Known types by library, but dynamically changeable | Large list | May or may not be available by license or host access |
| Library programs (some being licensed) | Larger list | Known types by library, but dynamically changeable | Larger list | May or may not be available by license or host access |
| Job management services | Some | Conditional JCL, etc. | N/A | Provided through agents |
| Customer input | A few - i.e., never offload, always offload, specific services | Through some means, defining where to/not to run this application or work unit; request services available only through offload - i.e., DB/2, CICS, TSO, ORACLE, Windows apps | A few | Input to technique through agent |
| Local, specialized services | | | Some | For example - DB/2, CICS, TSO, ORACLE, Windows apps 'native' on the offload server |

There may be a simple rule describing what to do if a processing system does or does not have the equivalent resource; or there may be more complex rules governing them. Also, the importance of some rules is higher than others, and lastly some offload resources are more valuable so need to be scheduled with that in mind; that is, in an order of preference. Examples are depicted in Table 2.

Table 2 describes rules for examples that may be used:

| Resource | Rule | Comments/exceptions | Override options |
|---|---|---|---|
| CPU resource | Normalized to hosts, must fit in configured value | i.e., can't run >24 hours, etc. | Can override |
| Memory | <=8 GB | Unless a change is made for it | No - System limit |
| Types of DASD, i.e., 3390 . . . | Is to be a subset | The access methods may not work with unknown hardware types | Maybe - i.e., customer does excp and knows it will work |
| Types of tape | Is to be a subset | The access methods may not work with unknown hardware types | Maybe - i.e., customer does excp and knows it will work |
| Other, multi-use (i.e., shared among systems) hardware | Is to be a subset | The access methods may not work with unknown hardware types | Maybe - i.e., customer does excp and knows it will work |
| Single use hardware | Is to be a subset | The access methods may not work with unknown hardware types | Maybe - i.e., customer does excp and knows it will work |
| Temporary files | Local or shared | Customer definition | Yes |

-continued

| Resource | Rule | Comments/ exceptions | Override options |
|---|---|---|---|
| Sysin/sysout files | All supported | Large volume can hit performance | No |
| System (compatible supervisor) services | If known, is to match | Assume yes | Yes |
| Well defined programs (some being licensed, others not) | Is to be supported | Data base lookup; if found, its requirements are to match; if not found assume yes | Yes |
| Library programs (some being licensed) | Is to be supported | Data base lookup; if found, its requirements are to match; if not found assume yes | Yes |
| Job management services | N/A | | |
| Customer input | Is to be supported | | Reject only if conflicts with "no" override resources |
| Local, specialized services | Honor, if available; look for this first | | No - if not available |

Decision Making Process:

In this example, there is an implied order in resource matching, from the most restrictive (or most expensive) to the least. It is 'possible' that there could be an override to this. The idea is to strike out OFLs that cannot meet the requirements so that the OFL with the least available resources meeting the complete request is chosen. If there are none, the work unit is not offloadable. The implied order for resource allocation is, in one example:

With the Above:
1. Applying the highest constraint rules first eliminates the offload processing systems that do not have the limited required resources.
2. Of the ones left, the rules are applied to the next highest and so on until what is left is all the offload processing systems that have all the resources required, and those that can through agent support (such as access to some files) to provide the services.

| Resource | Rule Order | |
|---|---|---|
| CPU resource | Low - assume all OFLs have the same CPU rating | Note that this may change over time and thus so would the order |
| Memory | Very low - all OFLs have "adequate" memory | |
| DASD volumes and other, multi-use (i.e., shared among systems hardware) | Medium-high | If the device type or volume required is not available on the OFL, it is either not offloadable or means high overhead to service |
| Tape devices & single use hardware | High | Same as above |
| Temporary files | Low | Performance would be better if local to OFL but not critical |
| Sysin/sysout files | N/A | Initially, all OFLs are to have an interface to the spooler |
| System (compatible supervisor) services | N/A | Initially, specific services required is unknown |
| Access methods | Highest | All access methods used by the work unit are to be supported by the OFL |
| Customer input | High-highest | As it helps to select an OFL |
| Local, specialized services | High | Depending on the number of OFL's supporting the service or device, its priority can decrease |

3. If no OFLs are available, the work unit is to be rejected.
4. At this point, a determination is made as to which offload processing systems are available to run the work unit, rejecting those already being used.
5. If no OFLs are available, based on configuration settings or job control, the work unit is either rejected or is made to wait for a while until an OFL becomes available. Note that this 'wait' is to be timed, in one example, and the work unit is eventually rejected if too many waits or retries have occurred.
6. If multiple offload processing systems are still available, the OFLs with the highest cost resources not used by the work unit are rejected, if any. For example, if the work unit does not use a cryptographic facility that is available on an OFL but not others, that OFL is removed. Similarly, if an OFL has access to 10 channels of DASD, but there are others with 4 and the work unit is satisfied by the 4, the 10 channel OFL is removed. In one example, the offload processing system with exactly the right set of resources, and no more, is to be used to execute a work unit. One way to select this offload processing system is to assign a relative value or 'cost' for each resource—based on its scarcity, acquisition/ownership cost and sharing capability. The sum of 'costs' by an offload processing system provides a relative measure of all the resources any one offload processing system contains versus others, and can be used to select the 'minimum' cost processing system capable of meeting the resource requirements of a unit of work.
7. Last, OFLs with the most costly I/O profile are eliminated if there are differences in I/O configuration amongst OFLs. These would be those where there is no direct access to DASD volumes required by a step and 'networked' or slower access to the host.
8. If multiple OFLs still meet the criteria, the first available is selected. In this example, this is now the selected offload processing system based on a best fit criteria.

Continuing with STEP 212 of FIG. 2, subsequent to selecting the offload processing system to execute the work unit, the job control language is modified to execute the work unit on the selected offload processing system, STEP 214. This modification is transparent to the user, and includes, for example, indicating in the JCL the selected offload processing system.

Thereafter, standard processing continues, STEP 216, which in this case includes assigning the work unit to execute on the selected offload processing system.

Figure 3:
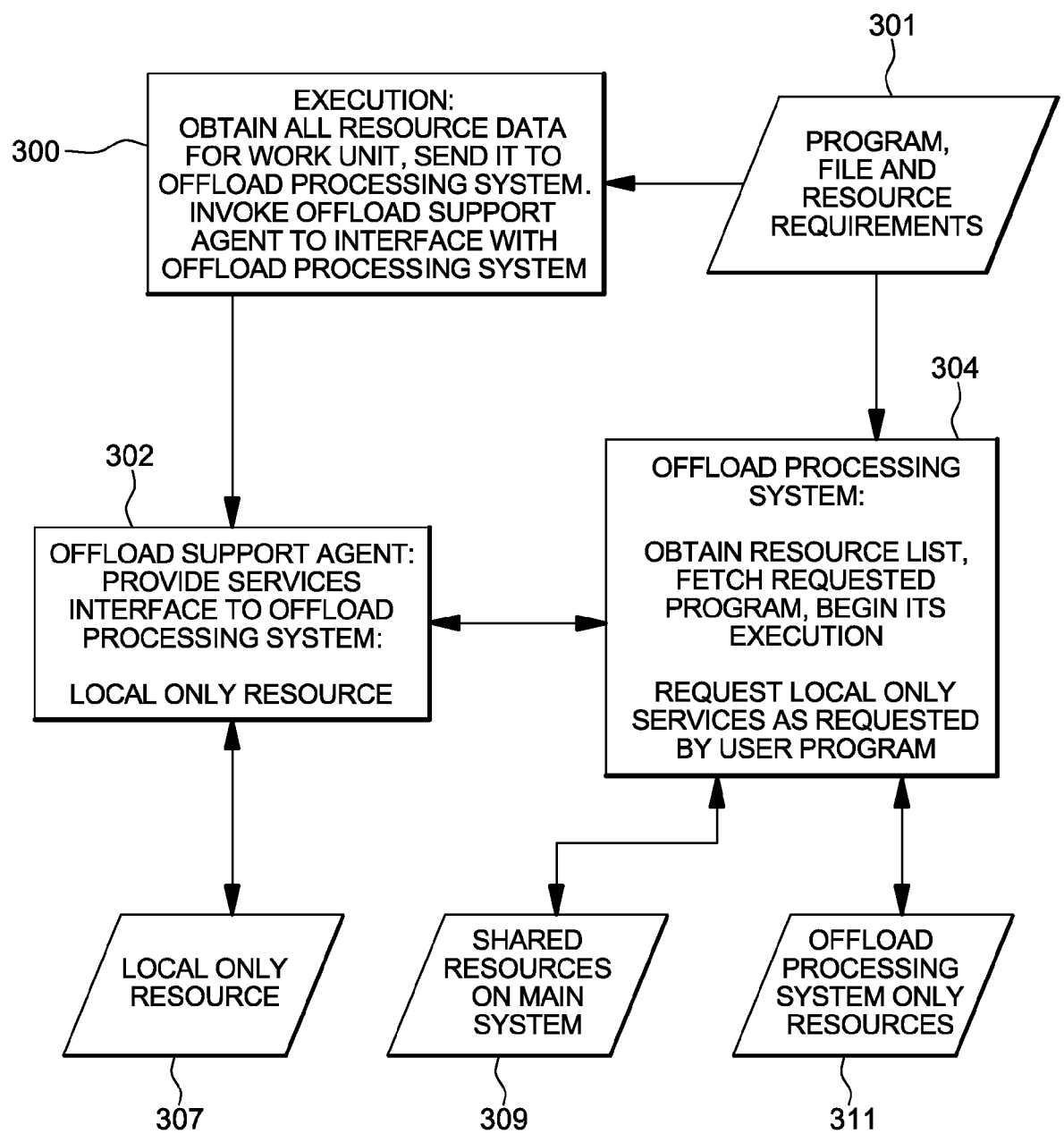
FIG. 3 depicts one example of executing the work unit on an offload processing system, in accordance with an aspect of the present invention.

Some time after the work unit is assigned for execution (e.g., seconds, minutes, hours, days, etc.), execution of the work unit is initiated and certain processing is performed, as described with reference to FIG. 3. In one example, it is the step analyzer (FIG. 1C) that controls execution of the work unit.

The resource data (e.g., the list of known resources required to execute this work unit) is obtained by the step analyzer (or another analyzer in another example) and sent to the selected offload processing system, STEP 300. In one example, the resource data is sent to the offload processing system via an offload support agent which interfaces with the offload processing system, STEP 302. A work unit marked as eligible for offloading has its original name and requested region size saved and replaced by the name and region requirements of the offload support agent. In one example, these changes are made without altering the JCL listing.

The offload support agent validates that the work unit can still be offloaded, captures work unit information (e.g., the list of required resources), and forwards the package to the offload processing system. The offload support agent executes on the main processor complex and provides access to services on the main system (e.g., only on the main system), such as spooling services and local DASD. The offload support agent is a problem state program executing on the main processor with no special privileges. It analyzes the resources needed for the work unit, requests an offload processing system based on this and passes the resource data to the offload processing system. It then processes service requests from the running work unit using, for instance, local resources 307. For instance, in a mainframe environment having a main processor (e.g., mainframe processor) and offload processing system, the work unit may be executed on an offload processing system, but certain mainframe services are desired as part of the execution. These services are requested by the offload processing system and performed by the offload support agent that has access to the resources (307) needed for the service.

In one example, the offload support agent:
Initializes, then locates the selected offload processing system and connects to it.
Obtains configuration information for this instance of offload processing system—its unique id.
Requests the selected offload processing system to execute the work unit.
If the selected offload processing system or another offload processing system is not available, either passes the work unit to main processor (e.g., z/OS®) or waits, based on configuration.
It determines if the work unit is still offloadable to the selected offload processing system (i.e., are the resources still available, has anything changed indicating that it should not be offloaded to the selected offload processing system; etc.). If the work unit is not offloadable to the selected offload processing system, then control is passed to the main processor (e.g., to the application invoking this work unit); or in another example, the offload support agent may select another offload processing system using the technique described above, assuming the work unit is still configured for offloading.
Passes the work unit information to the offload processing system, then provides execution support services.
Obtains execution environment information and sends to offload processing system;
Waits for execution completion or offload processing system requests, such as:
OPEN, I/O Requests, CLOSE for spooled and unsupported datasets. Returns status and control information to offload processing system.
Dynamic allocation and deallocation as necessary.
Catalog management, and Generation Data Group (GDC) support.
Program management services (e.g., locate load modules i.e., link, load, attach, xctl).
Error processing/recovery and server communication.
Operator/log messages.
At completion, uses the offload processing system-returned condition/completion code and terminates with it.

Responsive to the offload support agent providing the work unit and related information to the offload processing system, the offload processing system obtains the resource list (e.g., the list obtained in STEP 300), fetches the requested program 301, and begins its execution, STEP 304. It has access to shared resources 309 on the main system (e.g., an IBM® system), as well as offload server resources 311.

The offload processing system processes the work unit as it would any other work unit, including performing its own internal (i.e., operating system) scheduling, etc. It returns a result and/or condition code to the offload support agent, which provides this information to the main processor.

Described above is a system-wide, generic technique, integrated with the operating system, for offloading work units to offload processing systems. The technique encompasses, for instance, all jobs and work units that are run by the operating system. In one example, in which the operating system is z/OS®, the technique includes offloading DB/2®, CICS®, batch, TSO and other work units, based on their specific resource requirements. Manual scheduling is not needed, and neither is management by subsystems, like DB/2® and CICS®. DB/2® and CICS® are registered trademarks of International Business Machines Corporation, Armonk, N.Y.

In an environment with asymmetric multiple processors containing an asymmetric set of hardware and/or software, in one aspect of the present invention, a determination is made as to which is the best processing system to use to execute a specific work unit. A technique is provided for obtaining the resource requirements of a work unit and maintaining a current list of available offload processing systems with their available resources. It then computes the best fit offload processing system to use for this work unit, based on general and specific inputs, or rejects the work unit as an offload candidate, thus executing it on the main system.

In one example, the job control language statements for each work unit is evaluated for: specific exclusion/inclusion in offload evaluation; resource requests that prohibit offloading a work unit; resource requests that target a set of or individual offload processing systems; and/or programs or files that prohibit offload due to license or other constraints. If all the criteria for offload are met, then, in one example, when a work unit is scheduled for execution, a determination is made as to whether an eligible offload processing system is available. If so, it is sent to the offload processing system for execution. Otherwise, the work unit is either re-queued for processing on the main processor or it waits for an offload processing system.

This general technique for analyzing the execution requirements of work units, matching those requirements to resources of specific function or specialized processors, then once matched, offloading work to these processing systems, obtains multiple economies, including, for instance:

Execution on potentially less costly or faster processors;
Provides enhanced function unavailable to the main system;
Additional parallelism of execution by using additional processors; and
Potentially faster throughput by dedicating work to specific processors.

By offloading these work units, it is also possible to decrease license costs by:

Reducing the total billable MIP requirements on the offloaded system;
Reducing license costs for software no longer needed on the main system or on all hardware platforms;
Reducing software license fees for software products charged based on size of CPU; and
Reducing software costs by licensing software of less costly operating systems or processors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
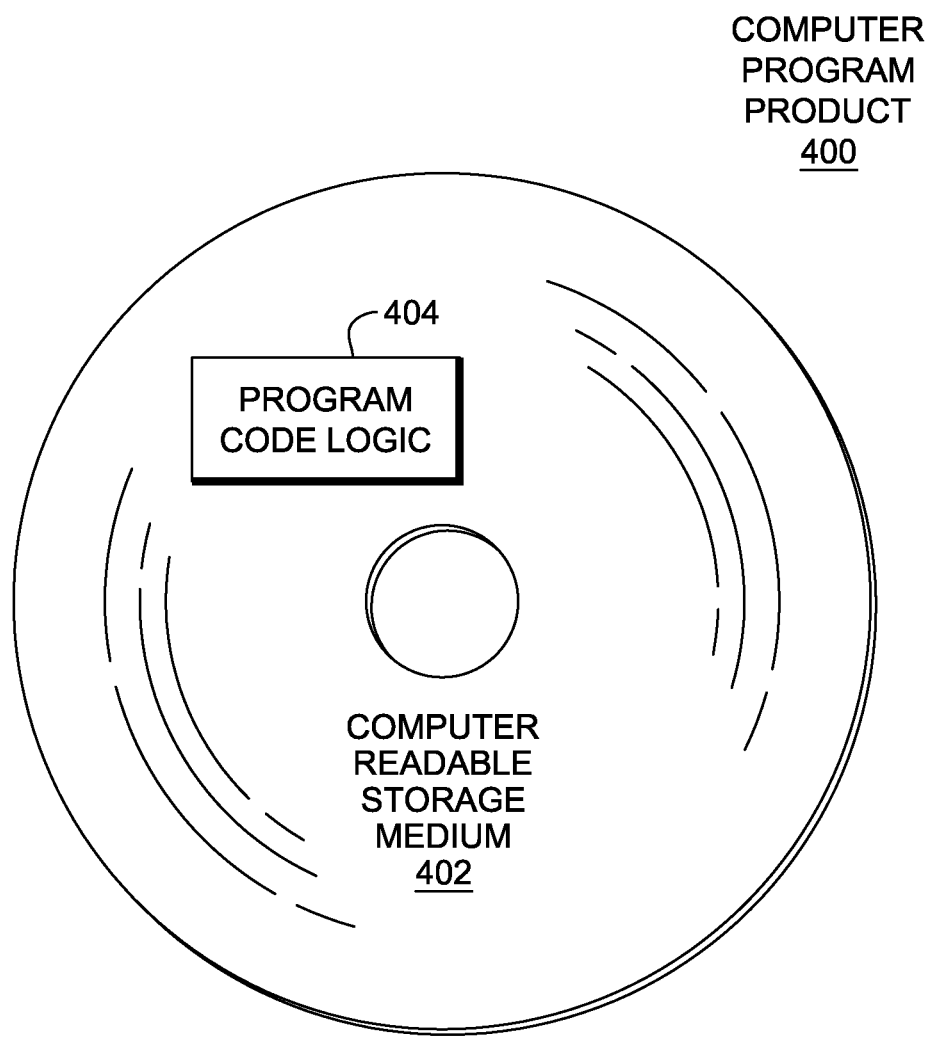
FIG. 4 depicts one embodiment of a computer program product incorporating one or more aspects of the present invention.

Referring now to FIG. 4, in one example, a computer program product 400 includes, for instance, one or more non-transitory computer readable storage media 402 to store computer readable program code means or logic 404 thereon to provide and facilitate one or more aspects of the present invention.

Program code embodied on a computer readable medium may be transmitted using an appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA™, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one more aspects of the present invention. Additionally, other types of offload processing systems or offload support agents may be used. Further, other criteria, tests and/or rules may be used to determine if a particular work unit is to be offloaded, and if so, to which offload processing system.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating execution of work units in a computing environment, said computer program product comprising:
 a non-transitory computer readable storage medium readable by a processing circuit and storing instructions for execution by the processing circuit for performing a method comprising:
  analyzing, by an analyzer executing on a processor, one or more resource requirements of a work unit to be executed;
  determining, based on the analyzing, whether the work unit is to be executed on the processor or an offload processing system different from the processor, the offload processing system and processor being heterogeneous of one another;
  obtaining, based on the determining indicating the work unit is to be executed on the offload processing system, an indication of one or more offload processing systems satisfying one or more criteria for execution of the work unit;
  checking whether at least one offload processing system of the indication of one or more offload processing systems has sufficient resources to execute the work unit;
  selecting, based on the checking specifying at least one offload processing system that has sufficient resources, a selected offload processing system to execute the work unit; and
  assigning the work unit to be executed on the selected offload processing system for execution, wherein the selected offload processing system has at least one of a different operating system, a different architecture or a different external attachment from the processor.

2. The computer program product of claim 1, wherein the checking specifies a plurality of offload processing systems having sufficient resources, and wherein the selecting chooses the offload processing system based on a best fit criteria.

3. The computer program product of claim 2, wherein the selecting based on the best fit criteria comprises:
 determining which one or more offload processing systems of the plurality of offload processing systems having sufficient resources have a highest cost of additional resources not needed by the work unit; and
 removing those one or more offload processing systems from consideration in the selecting.

4. The computer program product of claim 1, wherein the work unit is part of an application to be executed, the application having a plurality of work units, and wherein the method further comprises executing one work unit of the application on the selected offload processing system and another work unit of the application on the processor.

5. The computer program product of claim 1, wherein the processor and the offload processing system are loosely coupled, wherein there is a communications connection between them but otherwise an absence of sharing of resources.

6. The computer program product of claim 1, wherein the method further comprises modifying, based on the selecting, control language of the work unit to enable the work unit to execute on the selected offload processing system.

7. The computer program product of claim 1, wherein the method further comprises initiating execution of the work unit, the initiating comprising:
 determining whether the work unit is to execute on the selected offload processing system; and
 based on the determining indicating the work unit is to execute on the selected offload processing system, providing the work unit to the selected offload processing system.

8. The computer program product of claim 7, wherein the providing employs an offload support agent, the offload support agent interfacing between the processor and the selected offload processing system.

9. The computer program product of claim 1, wherein the method further comprises:
 based on the checking indicating that no offload processing system of the indication of one or more offload processing systems has sufficient resources to execute the work unit, waiting a predefined amount of time; and
 repeating the checking, based on waiting the predefined amount of time.

10. A computer system for facilitating execution of work units in a computing environment, said computer system comprising:
 a memory; and
 a processor in communications with the memory, wherein the computer system is configured to perform a method, said method comprising:
  analyzing, by an analyzer executing on a processor, one or more resource requirements of a work unit to be executed;
  determining, based on the analyzing, whether the work unit is to be executed on the processor or an offload processing system different from the processor, the offload processing system and processor being heterogeneous of one another;
  obtaining, based on the determining indicating the work unit is to be executed on the offload processing system, an indication of one or more offload processing systems satisfying one or more criteria for execution of the work unit;

checking whether at least one offload processing system of the indication of one or more offload processing systems has sufficient resources to execute the work unit;

selecting, based on the checking specifying at least one offload processing system that has sufficient resources, a selected offload processing system to execute the work unit; and assigning the work unit to be executed on the selected offload processing system for execution, wherein the selected offload processing system has at least one of a different operating system, a different architecture or a different external attachment from the processor.

11. The computer system of claim 10, wherein the checking specifies a plurality of offload processing systems having sufficient resources, and wherein the selecting chooses the offload processing system based on a best fit criteria.

12. The computer system of claim 11, wherein the selecting based on the best fit criteria comprises:

determining which one or more offload processing systems of the plurality of offload processing systems having sufficient resources have a highest cost of additional resources not needed by the work unit; and removing those one or more offload processing systems from consideration in the selecting.

13. The computer system of claim 10, wherein the work unit is part of an application to be executed, the application having a plurality of work units, and wherein the method further comprises executing one work unit of the application on the selected offload processing system and another work unit of the application on the processor.

14. The computer system of claim 10, wherein the method further comprises initiating execution of the work unit, the initiating comprising:

determining whether the work unit is to execute on the selected offload processing system; and based on the determining indicating the work unit is to execute on the selected offload processing system, providing the work unit to the selected offload processing system.

15. The computer system of claim 14, wherein the providing employs an offload support agent, the offload support agent interfacing between the processor and the selected offload processing system.

16. The computer system of claim 10, wherein the method further comprises:

based on the checking indicating that no offload processing system of the indication of one or more offload processing systems has sufficient resources to execute the work unit, waiting a predefined amount of time; and repeating the checking, based on waiting the predefined amount of time.

17. A method of facilitating execution of work units in a computing environment, said method comprising:

analyzing, by an analyzer executing on a processor, one or more resource requirements of a work unit to be executed;

determining, based on the analyzing, whether the work unit is to be executed on the processor or an offload processing system different from the processor, the offload processing system and processor being heterogeneous of one another;

obtaining, based on the determining indicating the work unit is to be executed on the offload processing system, an indication of one or more offload processing systems satisfying one or more criteria for execution of the work unit;

checking whether at least one offload processing system of the indication of one or more offload processing systems has sufficient resources to execute the work unit;

selecting, based on the checking specifying at least one offload processing system that has sufficient resources, a selected offload processing system to execute the work unit; and assigning the work unit to be executed on the selected offload processing system for execution, wherein the selected offload processing system has at least one of a different operating system, a different architecture or a different external attachment from the processor.

18. The method of claim 17, wherein the checking specifies a plurality of offload processing systems having sufficient resources, and wherein the selecting chooses the offload processing system based on a best fit criteria.

19. The method of claim 18, wherein the selecting based on the best fit criteria comprises:

determining which one or more offload processing systems of the plurality of offload processing systems having sufficient resources have a highest cost of additional resources not needed by the work unit; and removing those one or more offload processing systems from consideration in the selecting.

20. The method of claim 17, further comprising initiating execution of the work unit, the initiating comprising:

determining whether the work unit is to execute on the selected offload processing system; and based on the determining indicating the work unit is to execute on the selected offload processing system, providing the work unit to the selected offload processing system.

* * * * *